(12) United States Patent
Steinhilber

(10) Patent No.: US 6,943,975 B2
(45) Date of Patent: Sep. 13, 2005

(54) AUTOMATIC LIBRARY FOR DATA STORAGE TAPE CARTRIDGES

(75) Inventor: Friedhelm Steinhilber, Rottweil (DE)

(73) Assignee: Patentia Hergiswil AG, Hergiswil (CH)

( * ) Notice: Subject to any disclaimer, the term of this patent is extended or adjusted under 35 U.S.C. 154(b) by 568 days.

(21) Appl. No.: 10/005,693

(22) Filed: Nov. 8, 2001

(65) Prior Publication Data
US 2002/0080513 A1 Jun. 27, 2002

(30) Foreign Application Priority Data
Nov. 9, 2000 (DE) .......................................... 100 55 626

(51) Int. Cl.⁷ .............................................. G11B 15/18
(52) U.S. Cl. ....................................................... 360/69
(58) Field of Search ..................................... 360/69, 92

(56) References Cited

U.S. PATENT DOCUMENTS

| | | | | |
|---|---|---|---|---|
| 3,127,178 A | * | 3/1964 | Osborn et al. ................ | 360/92 |
| 3,807,741 A | * | 4/1974 | Uemura ........................ | 360/92 |
| 3,872,506 A | * | 3/1975 | Staar ............................ | 360/92 |
| 4,063,294 A | | 12/1977 | Burkhart ...................... | 360/92 |
| 4,361,858 A | * | 11/1982 | Chambers .................... | 360/92 |
| 4,384,310 A | * | 5/1983 | Schatteman et al. ......... | 360/92 |
| 4,484,239 A | * | 11/1984 | Timm .......................... | 360/92 |
| 4,519,009 A | * | 5/1985 | Bolick, Jr. ................... | 360/92 |
| 4,901,172 A | * | 2/1990 | Nakazawa et al. ........ | 360/98.05 |
| 4,910,619 A | * | 3/1990 | Suzuki et al. ................. | 360/92 |
| 5,148,332 A | * | 9/1992 | Tomita et al. ................ | 360/92 |
| 5,236,258 A | | 8/1993 | Bunch ....................... | 312/9.31 |
| 5,469,310 A | | 11/1995 | Slocum et al. ................ | 360/92 |
| 5,539,594 A | * | 7/1996 | Ito ............................... | 360/92 |
| 5,588,796 A | | 12/1996 | Ricco et al. ................. | 414/741 |

FOREIGN PATENT DOCUMENTS

| | | | | |
|---|---|---|---|---|
| EP | 1045382 A2 | 10/2000 | .......... | G11B/15/68 |
| JP | 05225666 A | 3/1993 | .......... | G11B/15/68 |

* cited by examiner

Primary Examiner—Sinh Tran
Assistant Examiner—K. Wong
(74) Attorney, Agent, or Firm—Baker Botts L.L.P.

(57) ABSTRACT

An automatic library for cartridges of data storage tapes comprises a drive for cartridges having the form of a flat right parallelepiped having a flat side and a magazine. The drive has a cartridge pocket adapted to receive the cartridges. The magazine comprises one or more receivers for the cartridges. The receivers are adapted to revolve on a closed path of revolution about the drive, the path of revolution being substantially in a plane. The cartridge pocket of the drive and the receivers of the magazine are disposed such that the magazine is positionable with one of the receivers being aligned with the cartridge pocket along an insertion axis for transfer of a cartridge. The cartridges are adapted to be disposed in the receivers of the magazine and in the cartridge pocket of the drive with the flat side lying flat in the plane of the path of revolution.

20 Claims, 2 Drawing Sheets

AUTOMATIC LIBRARY FOR DATA STORAGE TAPE CARTRIDGES

BACKGROUND OF THE INVENTION

1. Field of the Invention

The invention relates to an data storage systems. In particular, the invention relates to automatic libraries for cartridges of data storage tapes.

2. Related Art

In order to store large quantities of data, increasingly data storage tapes, in particular magnetic tapes, are used, which are accommodated in cartridges. A significant increase of the storage capacity is obtained through automatic libraries which can contain a multiplicity of cartridges. Such automatic libraries are available on the market in various construction types under the designation "tape library", "tape cartridge library" or "tape cartridge autoloader".

An automatic library of the above cited species is known, for example, from U.S. Pat. No. 5,236,258, which discloses a library containing a multiplicity of cartridges in a magazine which is referred to as "carousel". The cartridges which have the form of a flat right parallelepiped are disposed on end, substantially radially in the magazine. In the interior of the magazine are disposed two tape cartridge drives for the cartridges, whose cartridge pocket is correspondingly disposed on end. The magazine is disposed on a rotary table which can be driven and positioned in order to position in each instance a selected cartridge in front of the cartridge pocket of the drive, such that the associated cartridge can be changed from the magazine into the drive or from the drive into the magazine. Through a port (mail slot), implemented as an upright slot, the cartridges can be introduced from the outside into the magazine or can be removed from the magazine.

The disposition of the drive within the revolving magazine results in a compact structure of the device. The height of the device which is determined by the height of the cartridges positioned on end and the drive of the rotary table, however, is a disadvantage in such cases of application in which only a small vertical space is available.

BRIEF DESCRIPTION OF THE DRAWINGS

In the following, the invention will be explained in further detail with reference to the drawings, in which.

DESCRIPTION OF CERTAIN EMBODIMENTS OF THE INVENTION

In one embodiment of the invention, there is provided an automatic library for cartridges of data storage tapes, which, with large storage capacity, has low space requirements and, in particular, has a low vertical overall height.

According to a first embodiment of the invention, an automatic library for cartridges of data storage tapes comprises a drive for cartridges having the form of a flat right parallelepiped having a flat side, the drive having a cartridge pocket adapted to receive the cartridges; and a magazine, the magazine comprising one or more receivers for the cartridges, the receivers being adapted to revolve on a closed path of revolution about the drive, the path of revolution being substantially in a plane. The cartridge pocket of the drive and the receivers of the magazine are disposed such that the magazine is positionable with one of the receivers being aligned with the cartridge pocket along an insertion axis for transfer of a cartridge. The cartridges are adapted to be disposed in the receivers of the magazine and in the cartridge pocket of the drive with the flat side lying flat in the plane of the path of revolution.

In another embodiment of the invention, a method of accessing cartridges in an automatic library comprises providing a drive for cartridges, the drive having the form of a flat right parallelepiped having a flat side, the drive also having a cartridge pocket adapted to receive the cartridges; driving one or more receivers for the cartridges on a closed path of revolution about the drive, the path of revolution being substantially in a plane, aligning one of the receivers with the cartridge pocket of the drive along an insertion axis for transfer of a cartridge, and transferring a cartridges between the receiver and the cartridge pocket with the flat side lying flat in the plane of the path of revolution.

Figure 1:
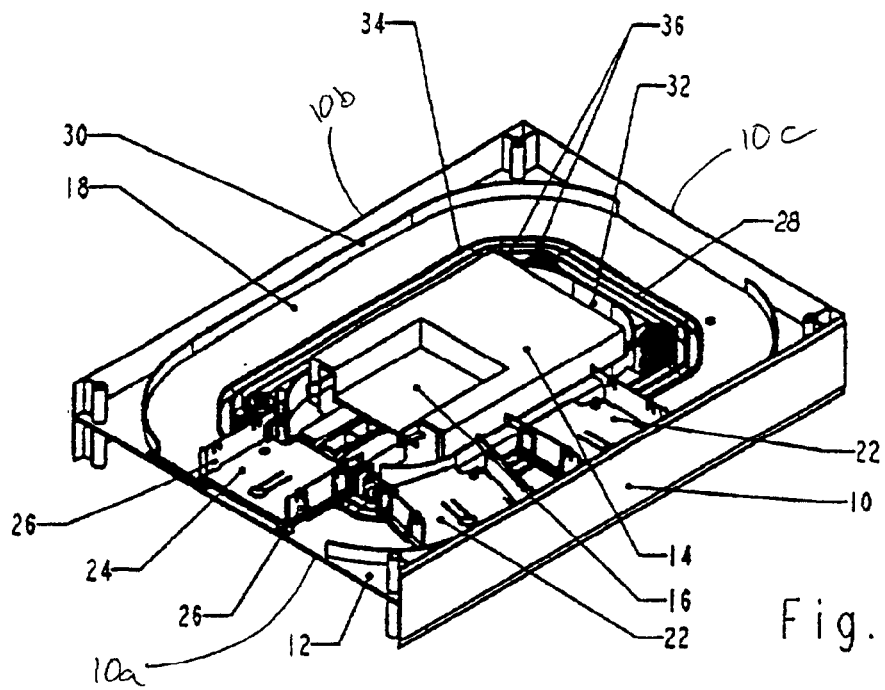
FIG. 1 is a pictorial, partial diagrammatic view of a first embodiment of a library according to the invention.
Figure 2:
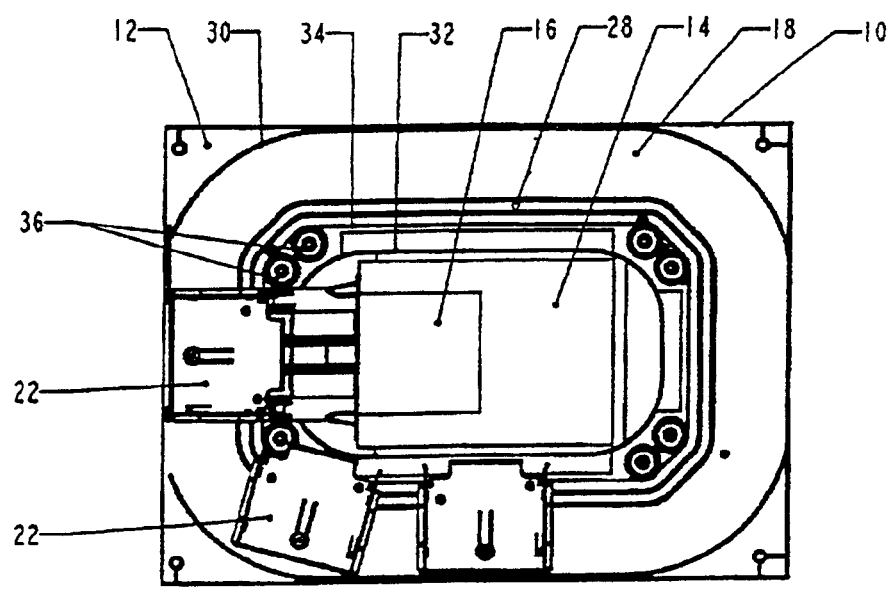
FIG. 2 is a top view of the library of FIG. 1.

In the embodiment example depicted in FIGS. 1 and 2, the library (tape library) comprises a housing 10, whose cover panel and front panel have been omitted in the figures for sake of clarity. The housing 10 has the shape of a flat right parallelepiped of low height in which the width of the front side 10a is less than the depth of the longitudinal sides 10b. In the housing 10, a base plate 12 is disposed horizontally. Centrally on the base plate is disposed a drive 14 for data storage tapes. The drive 14 is disposed such that the insertion direction of its cartridge pocket 16 is directed toward the narrow front side 10a of the housing 10 and, consequently, the direction of insertion of the cartridge pocket 16 extends parallel to the longitudinal sides 10b of the housing 10. The drive 14 has the shape of a flat right parallelepiped which rests with its flat side on the base plate 12 such that the cartridge pocket 16 is also disposed with its flat side parallel to the base plate 12.

A magazine 18 for the cartridges (not shown in FIGS. 1 and 2) is provided on a path of revolution on the base plate 12. The path of revolution of the magazine 18 encompasses the drive 14 and extends within the side walls of the housing 10. Thus, the path of revolution comprises two straight sections, parallel to one another, of the path of revolution of the magazine 18 between the longer sides 10b of the housing 10 and of the drive 14, and rounded-off sections between a rear transverse wall 10c of the housing 10 and the back side of the drive 14 as well as between the front side 10a of the housing 10 and the cartridge pocket 16 of the drive 14.

Cartridges may be disposed to lie flat in the magazine 18 with their flat side in the plane of the path of revolution and thus in the plane of the cartridge pocket 16. The path of revolution of magazine 18, consequently, overall has the shape of a rectangle with rounded-off corners inscribed between the outsides of the housing 10 and the drive 14.

As is evident from FIGS. 1 and 2, for the entire library, an extremely low overall height is obtained wherein, in spite of the flat-lying disposition of the cartridges in the revolving magazine 18, a space-saving width dimension can be maintained.

In order to transport the cartridges on the path of revolution of magazine 18, carriers 22 are provided which may have the form of drawers which comprise a bottom 24 in the plane of revolution and side guides 26 disposed radially with respect to the path of revolution. The bottom 24 and the side guides 26 are dimensioned such that each carrier 22 can contain a flat-lying cartridge. The carriers 22 are guided on their underside in a guidance slot 28 which is developed in the base plate 12 of the housing 10 and corresponds to the form of the path of revolution of magazine 18. An outer fence 30, encompassing the path of revolution of the magazine on its outer circumference, and an inner fence 32, forming the inner contour of the path of revolution, close off the carriers 22 on the path of revolution on its radially outer and radially inner side, whereby the cartridges 20 lying in the carriers 22 during the revolution are held in the magazine 18 on the carriers 22 laterally through the side guidances 26 and radially through the outer fence 30 and the inner fence 32.

In the base plate 12 is further provided a drive for the carriers 22. This drive comprises a continuously revolving driving means. In the embodiment illustrated in FIGS. 1 and 2, the revolving driving means comprises a continuously revolving toothed belt 34, which at the corners of the path of revolution runs over deflection wheels 36 which also bring about the driving of the toothed belt 34 by means of, for example, an electric motor. The carriers 22 are secured on the toothed belt 34 and are thereby moved by means of the driven toothed belt 34 on the path of revolution of magazine 18. Through the control of the drive, the carriers 22 and, with them, the cartridges contained in the carriers are positioned.

In the embodiment example illustrated in FIGS. 1 and 2, the magazine is dimensioned such that eight carriers 22 revolve around the drive 14 such that the magazine can contain eight cartridges 20. However, other embodiments may be sized to accommodate any number of carriers and cartridges.

The magazine 18, via the motion of carriers 22 with the cartridges 20, is controllable such that each of the carriers 22 can be selectively positioned on the front side of the housing 10. In this position a particular carrier 22 may be oriented radially aligned with the cartridge pocket 16 of the drive 14. In the region of this position, the inner fence is cut out such that in this position a cartridge located in the particular carrier 22 can be slid into the cartridge pocket 16 or a cartridge located in the cartridge pocket 16 can be ejected into the carrier 22. In this way an automatic cartridge change is possible. A cartridge located in the cartridge pocket 16 is transported into a free carrier 22. The magazine 18 is subsequently driven in order to position the carrier 22 with a selected cartridge in front of the cartridge pocket 16 and to transport this cartridge subsequently into the cartridge pocket 16 of the drive 14.

In the front side 10a of the housing 10 is provided a port (not shown) in the region in which the carrier 22 is disposed in aligned orientation with the cartridge pocket 16 of the drive 14. Through this port a cartridge can be removed from the particular carrier 22 of the magazine or a cartridge can be placed into the carrier 22 of the magazine 18. Thereby the exchange of the cartridges in the magazine 18 is possible. Since in this position the port, the carrier 22 and the cartridge pocket 16 of the drive 14 are disposed in continuous alignment, it is furthermore possible to insert cartridges directly from the outside through the port via the carrier 22 into the cartridge pocket 16 or to remove them from the cartridge pocket 16 via the carrier 22 and the port to the outside. With the magazine idle, the library can in this way be used in the same manner as a tape drive without a magazine.

Figure 3:
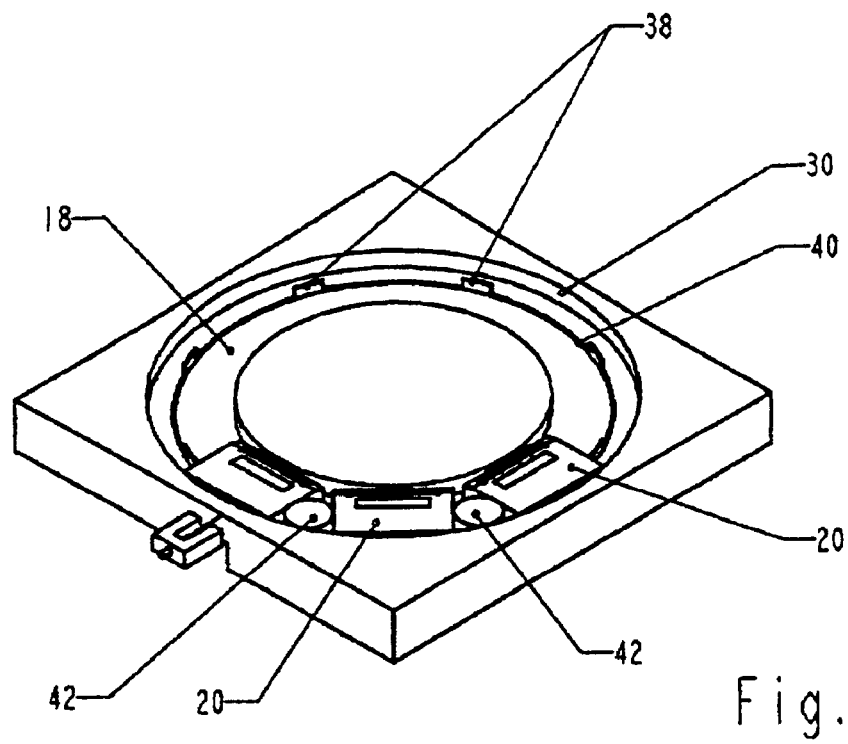
FIG. 3 is a simplified pictorial, partial diagrammatic representation of a second embodiment of a library according to the invention.
Figure 4:
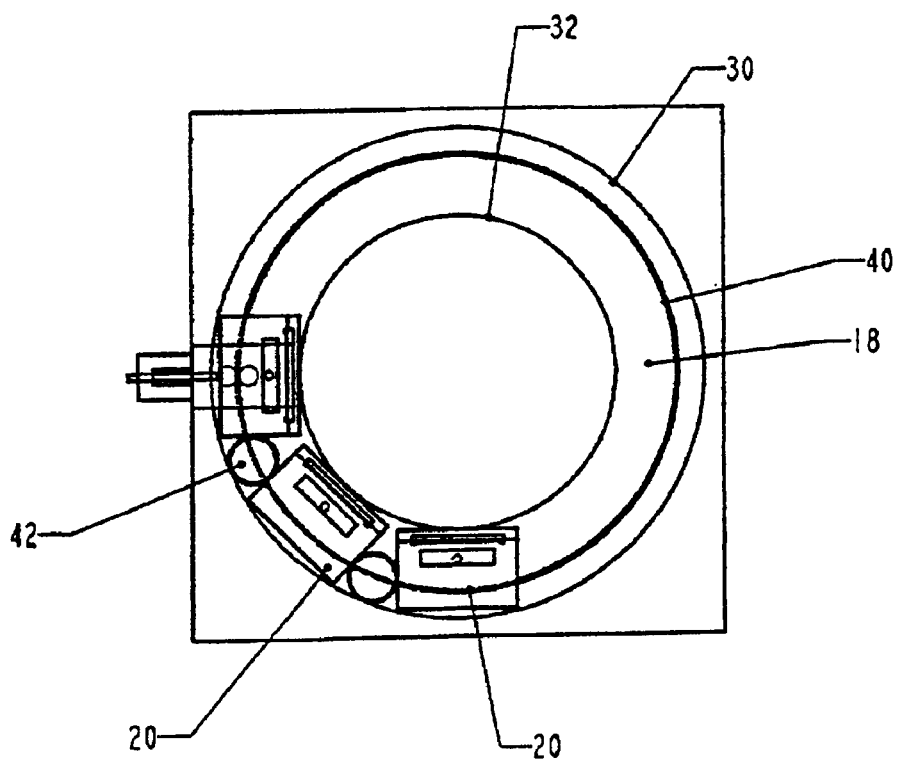
FIG. 4 is a top view of the library of FIG. 3.

In FIGS. 3 and 4, a further embodiment example is shown. In this embodiment, the magazine 18 also revolves in a closed path of revolution about a centrally disposed drive (not shown). Cartridges 20 are disposed lying flat in the magazine 18 in the plane of revolution such that the same low overall height can be realized.

In contrast to the embodiment illustrated in FIGS. 1 and 2, the magazine 18 in the present embodiment revolves on a circular path about the drive 14 such that an overall square disposition of the base plate 12 and thus of the side dimensions of the housing 10 results.

While the circular path of revolution of magazine 18 does lead to a greater width dimension of the entire library, it makes possible a simpler structure and driving of the magazine 18.

The cartridges 20 are placed free onto the base plate 12 and guided only radially between the outer fence 30 and the inner fence 32. Underneath the base plate 12 is disposed a circular, drivable rotary plate, which with catches 38 reaches through a circular slot 40 of the base plate 12 upwardly into the path of revolution of the magazine 18. The catches 38 are spaced apart in the circumferential direction such that distance spacers 42 placed onto the catches 38 reach between the cartridges 20 placed into the magazine 18 and retain them, on the one hand, in the circumferential direction, and, on the other, carry them along for the driving in the magazine 18.

Here also, in the same manner as in the embodiment example of FIGS. 1 and 2, the positioning of the cartridges 20 in a position of change in front of a cartridge pocket (not shown) of the drive is possible.

While particular embodiments of the present invention have been disclosed, it is to be understood that various different modifications and combinations are possible and are contemplated within the true spirit and scope of the appended claims. There is no intention, therefore, of limitations to the exact abstract or disclosure herein presented.

LIST OF REFERENCE SYMBOLS

10 Housing
12 Base plate
14 Drive
16 Cartridge pocket
18 Magazine
20 Cartridges
22 Carrier
24 Bottom
26 Side guidances
28 Guidance slot
30 Outer fence
32 Inner fence
34 Toothed belt
36 Deflection wheels
38 Catches
40 Circular slot
42 Distance spacer

What is claimed is:

1. An automatic library for cartridges of data storage tapes, comprising: a drive for cartridges having the form of a flat right parallelepiped having a flat side, said drive having a cartridge pocket adapted to receive said cartridges; and a magazine, said magazine comprising one or more receivers for said cartridges, said receivers being adapted to revolve on a closed path of revolution around the drive, wherein said cartridge pocket of the drive and the receivers of the magazine are disposed such that the magazine is positionable with one of said receivers being aligned with the cartridge pocket along an insertion axis for transfer of a cartridge, wherein the cartridges are adapted to be disposed in the receivers of the magazine and in the cartridge pocket of the drive with said flat side lying flat in a plane of the path of revolution wherein the receivers of the magazine comprise carriers adapted to contain cartridges, said carriers being adapted to be moved on the path of revolution by a continuously revolving driving means and are guided on their underside in a guide defining the path of revolution.

2. The library as claimed in claim 1, wherein said path of revolution is a circular path.

3. The library as claimed in claim 2, wherein the magazine further comprises a circularly revolving plate.

4. The library as claimed in claim 3, wherein the receivers comprise catches, said plate being adapted to engage with said catches into the path of revolution of the magazine, and said catches being adapted to engage a cartridge.

5. The library as claimed in claim 1, wherein the magazine has a non-circular path of revolution.

6. The library as claimed in claim 5, wherein the non-circular path of revolution comprises two straight path sections parallel with respect to one another and to the insertion axis.

7. The library as claimed in claim 1, wherein when one of said receivers of the magazine is aligned with the cartridge pocket, a radially outer side of said receiver is aligned with a port of a housing.

8. The library as claimed in claim 1, wherein said path of revolution being substantially in a plane.

9. The library as claimed in claim 1, wherein the continuously revolving driving means comprises a toothed belt running over deflection wheels.

10. A method of accessing cartridges in an automatic library, comprising: providing a drive for cartridges, said cartridges having the form of a flat right parallelepiped having a flat side, said drive having a cartridge pocket adapted to receive said cartridges; driving one or more receivers for said cartridges on a closed path of revolution around the drive by moving said carriers on the path of revolution by a continuously revolving driving means and guiding the carriers on their underside in a guide defining the path of revolution aligning one of said receivers with said cartridge pocket of the drive along an insertion axis for transfer of a cartridge, and transferring a cartridges between said one of said receivers and said cartridge pocket with said flat side lying flat in a plane of the path of revolution.

11. The method as claimed in claim 10, wherein said path of revolution is a circular path.

12. The method as claimed in claim 11, wherein the receivers comprise catches formed on a circularly revolving plate, said catches being adapted to engage a cartridge.

13. The method as claimed in claim 10, wherein said path of revolution is non-circular.

14. The method as claimed in claim 13, wherein the non-circular path of revolution comprises two straight path sections parallel with respect to one another and to the insertion axis.

15. The method as claimed in claim 10, wherein when said one of said receivers is aligned with the cartridge pocket, a radially outer side of said receiver is aligned with a port of a housing.

16. The method as claimed in claim 10, wherein said path of revolution being substantially in a plane.

17. The method as claimed in claim 10, wherein the continuously revolving driving means comprises a toothed belt running over deflection wheels.

18. An automatic library for cartridges of data storage tapes, comprising: a drive for cartridges having a cartridge pocket adapted to receive a cartridge, said cartridge having a flat side; and a magazine including one or more receivers for holding said cartridges, said receivers being adapted to revolve on a closed path of revolution around the drive, wherein each of said receivers is capable of being aligned with the cartridge pocket along an insertion axis for transfer of a cartridge between said receiver and said cartridge pocket, and wherein each of said receivers and the drive are adapted to receive a cartridge with said flat side lying flat in a plane substantially parallel to said plane of revolution, wherein the receivers of the magazine comprise carriers adapted to contain cartridges, said carriers being adapted to be moved on the path of revolution by a continuously revolving driving means and are guided on their underside in a guide defining the path of revolution.

19. An automatic library for cartridges of data storage tapes, comprising: a drive means for accessing cartridges, said drive means having a cartridge pocket adapted to receive a cartridge, said cartridge having a flat side; means for holding cartridges outside said cartridge pocket; means for driving said means for holding on a closed path of revolution about the drive, said path of revolution being substantially in a plane of revolution, means for transferring a cartridge between said holding means and said cartridge pocket with said flat side lying flat in a plane substantially parallel to said plane of revolution, wherein the receivers of the magazine comprise carriers adapted to contain cartridges, said carriers being adapted to be moved on the path of revolution by a continuously revolving driving means and are guided on their underside in a guide defining the path of revolution.

20. The library as claimed in claim 19, wherein said path of revolution being substantially in a plane.

* * * * *